March 31, 1953 S. I. TOURSHOU 2,633,554
BEAM DEFLECTION CONTROL
Filed Jan. 24, 1948 2 SHEETS—SHEET 1

INVENTOR
Simeon I. Tourshou
BY [signature]
ATTORNEY

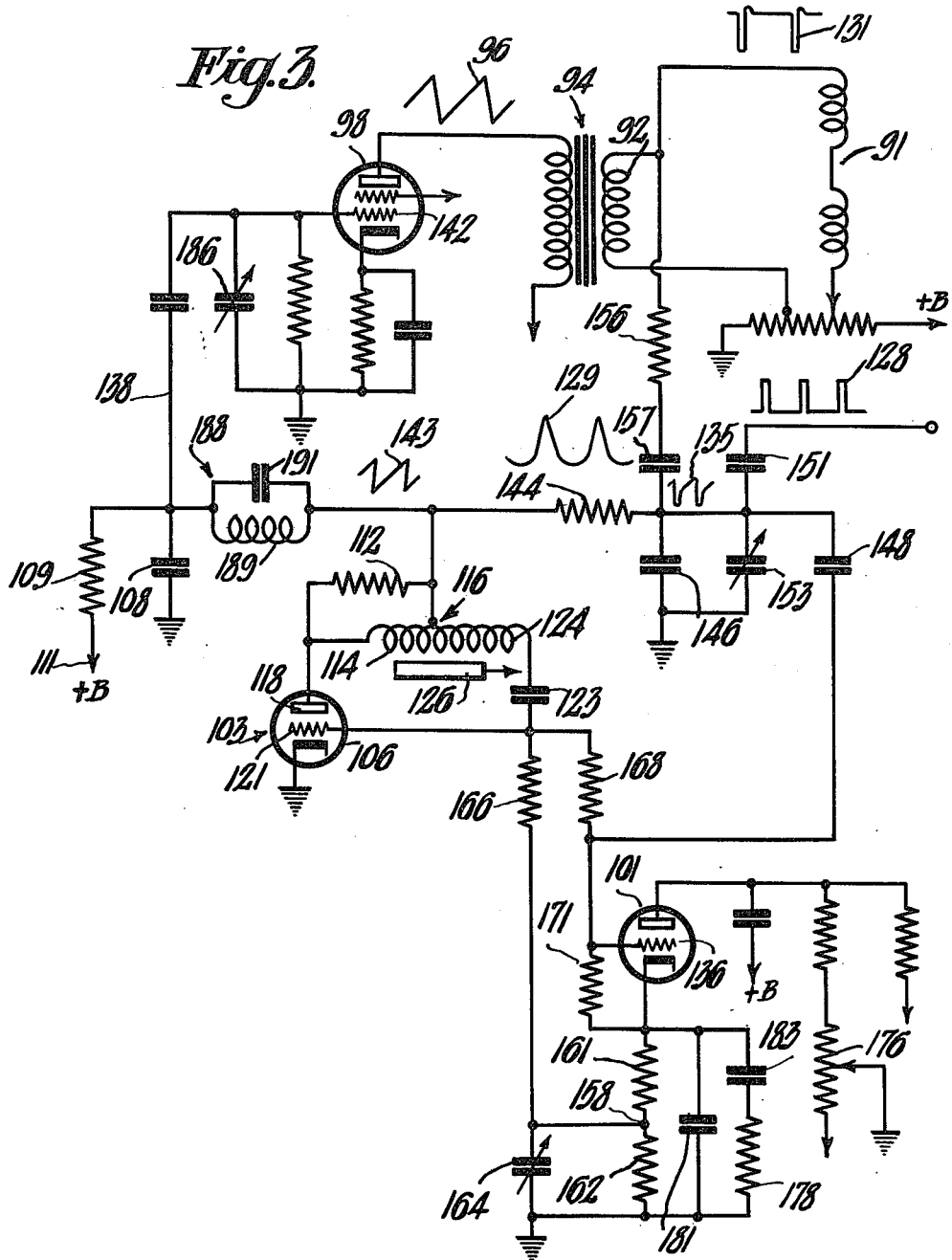

Patented Mar. 31, 1953

2,633,554

UNITED STATES PATENT OFFICE 2,633,554

BEAM DEFLECTION CONTROL

Simeon I. Tourshou, Philadelphia, Pa., assignor to Radio Corporation of America, a corporation of Delaware Application January 24, 1948, Serial No. 4,192

5 Claims. (Cl. 315—26)

The present invention relates to control of the deflection of a cathode ray beam and more particularly, but not necessarily exclusively, to a novel method of and a system for controlling the operation of a scanning wave generator.

This invention has for its principal aim or object to provide for the initiation of each cycle of operation of a self-operating non-sinusoidal wave generating system substantially independently of extraneous influences on the system and, also, of the effect of inherent characteristics of system components. For example, in accordance with the system of this invention, operation is less dependent on tube parameters. This is accomplished in practicing the invention by rendering the wave generator of the system insensitive to applied pulse energy except at a time which is made definite with respect to the normal self energizing or self activating time of the generator.

Another object of the invention is to provide a novel method of and means for combining a non-sinusoidal wave with a sinusoidal wave to effect control of an oscillator.

A further object of the invention is to provide novel means for providing a composite saw tooth wave, exponential wave and sinusoidal wave control signal for initiating operation of a non-sinusoidal wave generator.

Other objects and advantages of the present invention will, of course, become apparent and immediately suggest themselves to those skilled in the art to which the invention is directed from a reading of the following specification in connection with the accompanying drawing in which:

Fig. 3 shows a further form which is preferred for certain applications.

Figure 1:
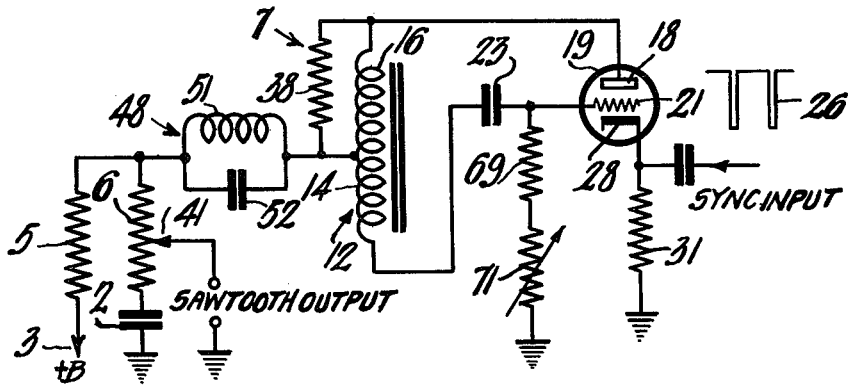
Fig. 1 is a diagrammatic illustration of a sawtooth wave generator embodying the invention.

Referring now to the drawing, and for the present to Fig. 1 thereof, there is shown a generator of non-sinusoidal waves having a capacitance 2 charged from a suitable source of positive potential (not shown) from a terminal 3 through a resistive circuit comprising resistors 5 and 6 which are effectively in series. The capacitance 2 is discharged at appropriate times in accordance with the invention by the action of a blocking oscillator indicated generally by the reference character 7. The blocking oscillator 7 is of the type disclosed and claimed in the copending application of the present inventor entitled Sawtooth Wave Generator, filed September 27, 1947. and bearing Serial No. 776,465, now Patent No. 2,538,541, granted January 16, 1951. The oscillator 7 comprises a single coil 12, which may be regarded as an autotransformer having a secondary or grid section 14 and a primary or plate section 16. The plate section 16 is connected to the anode 18 of a discharge tube, such as the three electrode vacuum tube 19. The grid 21 of this tube is connected through a capacitance 23 to the end of the grid section 14. Synchronizing impulses, such as television sync signals, usually in the form of timed recurring pulses 26, are fed into the cathode 28 of the tube 19. The cathode is returned to ground by way of an unbypassed resistor 31.

Under conditions of operation of the non-sinusoidal generator, the capacitance 2 is charged through the resistors 5 and 6. Discharge, or partial discharge, of this capacitance is brought about by a sync pulse 26, which initiates an oscillation slightly before the would-be free-running oscillation which, as the grid swings positive, discharges or partly discharges the capacitance 2. A resistor 38 serves as a damping resistor which is shown as being connected across the coil section 16.

The output voltage of sawtooth wave form is taken from the resistor 6, which serves as a potentiometer having a moveable contact 41. With the potentiometer connection shown, the frequency of oscillation of the generator is independent of the setting. A change in position of the contact 41 provides for variable "high peaking" so that the output wave may have a variable impulse part.

A tuned circuit 48 comprising an inductance 51 and a capacitor 52 is connected between the coil sections 14 and 16 and the capacitor 2. This circuit is tuned to approximately the free-running operating frequency of the blocking oscillator which also corresponds to the frequency of the sawtooth wave. The effect of this tuned circuit is to provide a sine wave which is added to the saw-tooth wave on the plate of the tube 19 and also to the exponential wave which appears at the grid.

Figure 2:
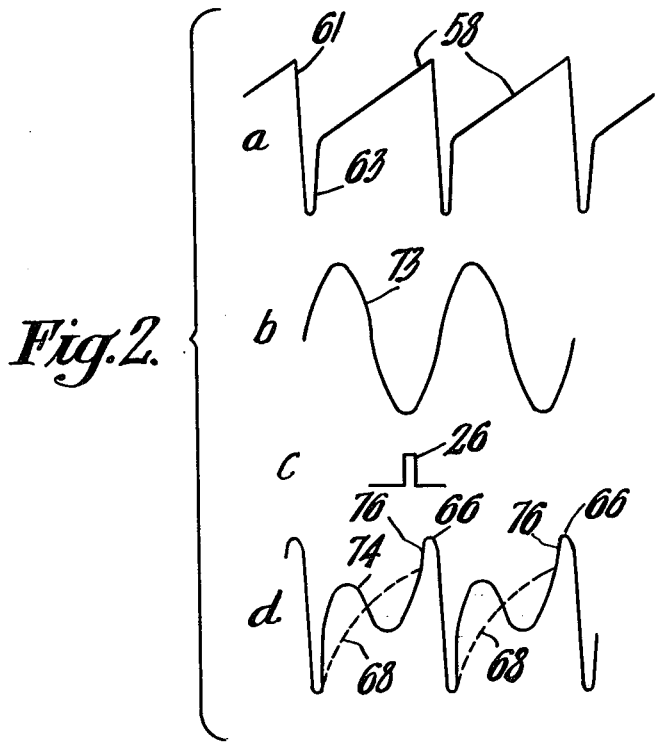
Fig. 2 shows a series of curves which are illustrative of the operation of the generator of Fig. 1.

In operation of the arrangement of Fig. 1, the capacitance 2 is charged through the resistors 5 and 6 in series, the charge curve 58 (Fig. 2) being substantially linear initially. The sync pulses 26, shown as extending in the positive direction in Fig. 2 for convenience, bring about an abrupt discharge of the capacitor as represented at 61. The resistor 6, which is in the discharge path of the capacitor 2 as well as in the charging path, has the function of providing the pulse portion 63 of the wave, since the capacitor 2 cannot be completely discharged due to the time constant of the capacitance 2 and the resistor 6 as well as the plate resistance of the tube. When the tube 19 is blocked, as will be explained hereinafter, the plate voltage does not have to rise slowly from the cathode potential, but instead rises immediately to an appreciable value due to the charge that remains on the capacitor 2. The plate voltage then rises slowly along the curve 58 which, as indicated, is substantially linear. Upon occurrence of a sync pulse 26, the grid voltage is raised immediately and increases, due to transformer action, as indicated at 66. Following this, the grid is driven abruptly negative, the negative charge for the purpose being stored in the capacitor 23 which leaks off as represented by the portion of the curve designated 69. This capacitor discharges through a grid resistor 69 in series with an adjustable resistor 71. The time of discharge can be regulated by varying the resistance of the resistor 71.

When the cycle of events just explained is initiated, the tuned circuit is excited and oscillates or begins to oscillate at approximately the frequency of the production of the sawtooth wave 58 by the capacitor 2. This sinusoidal wave is indicated by the curve 73 of Fig. 2. This wave 73 is added to the exponential curve 68 as shown approximately and illustratively by the solid line curve 74 of Fig. 2d of the drawings. It will be observed that the critical part 76 of this curve, which corresponds to a part of the curve 68 just before the conduction point of the tube is reached, has a much steeper slope and that the oscillator 7 is less sensitive to externally applied pulses such as noise pulses and internally produced undesirable pulses, such as pulses which may be produced by a microphonic condition of the tube 19 or by departures of other components in the system from a predetermined standard. It is to be noted that standards of quality of system components may be relaxed when this invention is practiced without a sacrifice in results. Just before the conduction point of the tube 19 is reached which occurs abruptly along the line 76, the current of the next successive sync pulse 26 causes the cycle to be repeated and energy is imparted to maintain or to reinitiate oscillation of the tuned circuit 48.

Fig. 3 of the drawings shows a preferred arrangement of the beam deflection control system in accordance with the invention. This figure of the drawing shows, illustratively, the horizontal deflection system for a television receiver having a set of horizontal deflection coils 91. This set of deflection coils surrounds an appropriate part of an image tube (not shown) to produce line deflection of the cathode ray beam therein, when it is supplied with current flowing in the secondary 92 of a transformer 94. It will be understood that the action of the coils 91 in conjunction with an action of a set of vertical (field or frame) deflection coils (not shown) produce a scanning raster. It will be understood also that a damper tube (not shown) is usually provided for a purpose which is by now well known and may, for example, be of the type disclosed in the U. S. patent to Schade No. 2,309,672, granted February 2, 1943, which shows a damper tube in the plate circuit of a scanning output tube. Damping may also be accomplished in the manner taught in Blumlein Patent Reissue No. 21,400, for example.

A sawtooth of current 96 produced in the plate circuit of an output tube 98 in a manner to be described in connection with the functioning of a controlled oscillator tube 106 produces the scanning current in the deflection coils 91.

A control tube 101 controls a blocking oscillator 103 which comprises an oscillator tube 106.

A capacitor 108 is connected to a suitable source of positive potential (not shown) through a charging resistor 109. The point of connection to the positive potential source is indicated diagrammatically as a terminal 111. The capacitor 108 and the resistor 109 correspond to the capacitor 2 and resistor 5 of Fig. 1 of the drawings. Under certain conditions of operation of the tube 106, the capacitor 108 is charged through the resistor 109. This capacitor is discharged when the tube 106 becomes conductive. A resistor 112 is connected across the plate section 114 of a coil 116, or at least a portion thereof, to serve as a damping resistor. The plate section 114 is connected to the anode 118 of the oscillator tube 106 and the grid 121 of this tube is connected through a capacitor 123 to the end of the grid section 124. A movable core 126 of powdered iron, for example, may be associated in the flux path of the coil 116 in the manner described in Patent No. 2,538,541, referred to above. The sync pulses 128, a parabolic wave 129 and a pulse wave 135 are combined on the grid 136 of the control tube 101 in the manner described in the copending application for U. S. Letters Patent of the present inventor entitled Beam Deflection Control, filed October 31, 1947 and bearing Serial No. 783,303.

A connection shown schematically at 138 is available for connection to the control grid 142 of the tube 98. The sawtooth voltage 143 produced by the controlled oscillator 103 is changed to the parabolic wave form 129, or approximately a parabolic wave form, by a resistor 144 and a capacitor 146. This parabolic wave is applied by a coupling capacitor 148 to the grid 136 of the control tube 101. The separated sync signal comprising the pulses 128 is applied through a capacitor 151 to the grid coupling capacitor 148. These pulses are partly attenuated by capacitors 151, 146, and a variable capacitor 153. Voltage pulses 131 which are produced in the secondary 92 of the deflection transformer 94 are modified by an R-C (resistance-capacitance) combination 156 and 157 and to the form 135 and are also applied to the grid coupling capacitor 148. The resulting wave form has a variable width pulse portion as the phase of the combined wave changes with respect to the phase of the sync pulses.

On the "gating" part of the cycle of the series of combined waves the tube 101 is caused to conduct. There is a minimum average plate current flowing in the tube 101 when the sync pulse is falling behind the combined wave. In this condition the pulse width of the effective pulse or effective portion of the wave is small. The control point 158 is less positive in voltage with respect to a common reference such as ground due to the minimum plate current flowing in the tube 101. Point 158 becoming less positive, reduces the rate of discharge of grid capacitor 123 and slows down the rate of oscillation. A resistor 161 serves as a cathode degeneration resistor. A resistor 166 serves as an oscillator grid leak and provides a discharge path for the capacitor 123. The resistor 166 is connected to the point 158 whereby there is an increased rate of discharge of the capacitor 123. If the capacitance value of a variable capacitor 164 is increased, the frequency of the oscillator 103 will decrease. A sawtooth of voltage appears across the capacitor 164 in operation of the system. The amount and shape of the A. C. voltage at the point 158 is varied with the change and adjustment of the capacitor 164. Since this voltage is in series with the grid leak 166 of the oscillator tube 106, it can readily be seen that the oscillator frequency will be caused to change.

The direction of such change with an increase in capacitance value of the capacitor 164 is indicated immediately above. A resistor 168 which may have a high resistance supplies bias for the control tube grid.

An adjustable resistor 176 varies the cut-off point of the tube 101, which has the effect of varying the "gating" effect of this tube. With the adjustable resistor 176 set to an increased value, it causes the frequency of the oscillator 103 to increase.

The previously mentioned variable capacitor 174 varies, or may be used to vary, the amplitude of the combined wave form.

A resistor 178 eliminates the tendency of the system to hunt. If this resistor 178 were not present, then the time constant would consist of resistance 162, plus a resistance 161 shunted by a capacitance 181, plus the capacitance of a capacitor 183. The capacitance of the capacitor 183 is large and, therefore, the time constant is large. It, therefore, takes a relatively long time for the voltage across the cathode of the tube 101 to build up to any new value required by the changing speed, either of the signal or the oscillator 103. Thus the tube 101 would not be fast enough in its correcting action if the resistor 178 were omitted.

An adjustable capacitor 186 provides an inexpensive form of adjustment for the amplitude of the sawtooth wave fed to the grid of the deflection output tube 98.

A tuned circuit comprising an inductance 189 and a capacitor 191 develops a sine wave, as in Fig. 1, which combines with the sawtooth wave 143 developed by the capacitor 108, and with the exponential discharge wave on the grid 121 of the oscillator tube 106. The grid voltage, therefore, approaches the firing point more abruptly near the normal firing point or bias level at which the oscillator 103 will begin to repeat its cycle of operation. This will prevent inadvertent rise in the grid voltage caused by noise, a change in tube circuit conditions or from other causes. Therefore, the control exercised by the guiding or control signal applied from the point 159 becomes predominant.

Having now described the invention, what is claimed and desired to be secured by Letters Patent is the following:

1. In a television system, an oscillator, means comprising a resistor and a condenser having a sawtooth output wave form, a resonant circuit in a connection between said oscillator and said means, a source of sync signals, said sync signals being in the form of pulses, means to combine said sync signals and said sawtooth, means comprising a vacuum tube biased from said oscillator, said tube being responsive to said combining means thereby to produce a control voltage for said oscillator, and means to apply said control voltage to control the oscillating frequency of said oscillator.

2. In a television system, a deflection means producing voltage pulses in operation, means for partially integrating and attenuating said pulses, a source of sync signals, said sync signals being in the form of pulses, a source of voltage of sawtooth wave form, means for converting said sawtooth voltage wave to parabolic waveform, means to combine said sync signals, said partially integrated and attenuated pulses, and said parabolic wave directly, means responsive to said combining means for producing a control voltage, an oscillator for controlling operation of said deflection means, a resonant circuit in a connection between said oscillator and said source of voltage of sawtooth waveform, and means to apply said control voltage to control the oscillating frequency of said oscillator.

3. In a television system, an oscillator, means comprising a resistance and a condenser for producing a voltage wave having a sawtooth wave form in operation, a resonant circuit in a connection between said oscillator and said means, a source of sync signals, said sync signals being in the form of pulses, means for combining said sawtooth voltage wave and said sync signals whereby the phase relationship of said sync signals with respect to said sawtooth wave is such that their peaks occur substantially simultaneously for a given phase relationship between the sawtooth wave and the sync pulses, means for developing an output voltage in accordance with phase changes in the peaks of one wave form with respect to the peaks of the other, and means comprising a variable resistor for adjusting the operation of said last named means of such nature that the frequency of said oscillator is controllable.

4. In combination, a blocking oscillator comprising an autotransformer having a grid coil section and a plate coil section, means comprising a resistor and a condenser having a sawtooth output wave form, a resonant circuit in a connection between said oscillator and said means, a grid condenser connected to said grid coil section, said oscillator being capable of having its rate of oscillation controlled by the application to said condenser of a frequency controlling signal, a pulse source, automatic frequency control means for producing a frequency controlling signal upon comparison of pulses from said source and the sawtooth output wave form, and signal transfer means for applying said controlling signal to said condenser.

5. A deflecting circuit having an oscillator therein, means for producing a voltage wave of recurring peaks having a definite time relationship with respect to the frequency of said oscillator, a resonant circuit connected between said means and said oscillator, means for superimposing received sync pulses upon recurring peaks of said voltage waves, means for producing a frequency control voltage having a value which changes in response to a change in the relative phase positions of said sync pulses and the recurring peaks of said wave, and means for controlling the frequency of said oscillator in accordance with said control voltage.

SIMEON I. TOURSHOU.

REFERENCES CITED

The following references are of record in the file of this patent:

UNITED STATES PATENTS

| Number | Name | Date |
| --- | --- | --- |
| 2,209,507 | Campbell | July 30, 1940 |
| 2,277,000 | Bingley | Mar. 17, 1942 |
| 2,297,742 | Campbell | Oct. 6, 1942 |
| 2,339,536 | Wendt | Jan. 18, 1944 |
| 2,358,297 | Bedford | Sept. 19, 1944 |
| 2,358,545 | Wendt | Sept. 19, 1944 |
| 2,360,697 | Lyman | Oct. 17, 1944 |
| 2,389,025 | Campbell | Nov. 13, 1945 |
| 2,464,259 | Proskauer | Mar. 15, 1949 |
| 2,479,081 | Poch | Aug. 16, 1949 |
| 2,493,517 | Applegarth, Jr. | Jan. 3, 1950 |
| 2,538,541 | Tourshou | Jan. 16, 1951 |